*INVENTOR.*
DONALD L. HEATH 3,162,831
ELECTRICAL VALVE RESISTOR
Donald L. Heath, Barberton, Ohio, assignor to The Ohio Brass Company, Mansfield, Ohio, a corporation of New Jersey
Filed Sept. 7, 1961, Ser. No. 136,673
7 Claims. (Cl. 338—21)

This invention relates to a non-linear resistor adapted for use as a valve resistor in a lightning arrester, etc. As the voltage increases across the resistor, the resistance drops so rapidly that the current flow increases more rapidly than the voltage increases.

The primary conductor in the resistor composition of this invention is silicon carbide or other crystalline carbide semi-conductor such as tungsten or boron carbide, etc. These semi-conductors are used in the form of crystals (often called grains) as is customary in the art at the present time. Aluminum phosphate which is electrically inert, is employed as a binder.

In bonding the semi-conductor grains together, it is customary to use a binder which holds the grains in contact to provide an electro-conductive path for the flow of electric current. Various materials have been used in these binders, such as, for example, aluminum phosphate, iron oxide, etc. In firing the resistor, the firing time and temperature are regulated to prevent the grains from fusing into a solid mass and to maintain the point contact between the grains.

I have found that certain of the materials, if used in the binder, form current paths between the grains and act as linear conductors so that the non-linearity of the resistor is adversely affected. For example, iron oxide present in a resistor of this type is reduced at the firing temperature of the block, in the order of about 2200° F., and contributes markedly to the conductivity of the valve. The resistor of the present invention is relatively free of iron oxide and other linear conductors.

According to this invention, there is added to the silicon carbide or other carbide semi-conductor, prior to firing, manganese oxide or other manganese compound which reacts with the carbide on firing to form manganese silicide which becomes a component of the bond between the grains. Ordinarily, substantially one-half percent to four percent of manganese (calculated as the oxide) is used. One to two percent is preferred. The use of the manganese dioxide increases the conductivity of the block. The use of over four percent causes firing difficulties, such as the formation of blisters. The manganese compound reacts with the silicon carbide to produce crystalline manganese silicide which improves the homogeneity of the block by holding the silicon carbide grains in more intimate contact, and increases the contact area. This results in higher conductivity and a larger useful cross section and therefore better durability. Care is taken not to employ so much as to cause the entire block to become fused. The manganese compounds which can be used include, in addition to $MnO_2$, various ores and other oxides, sulfates and phosphates, manganese carbonate, manganese silicate, manganese borides, etc.

The valve block is made by mixing 50 to 80 parts of silicon carbide or other crystalline semi-conductor with 5 to 35 parts of aluminum phosphate (which may be added as aluminum oxide plus phosphoric acid or aluminum phosphate) and including no more than 5 percent $Fe_2O_3$; and 0.5 to 4 percent manganese oxide or other manganese compound which on firing produces manganese silicide.

Representative formulae (in which the amounts of the materials added to the silicon carbide are given as approximate percentages of the oxide equivalents) follow:

*Formula I*

|  | Percent |
|---|---|
| SiC | 50 to 80 |
| $Al_2O_3$ | 5 to 35 |
| $MnO_2$ | 0.5 to 4 |

*Formula II*

| SiC | 50 to 80 |
|---|---|
| $Fe_2O_3$ | ½ to 5 |
| $Al_2O_3$ | 5 to 35 |
| $MnO_2$ | 0.5 to 4 |

*Formula III*

| SiC | 64 |
|---|---|
| $Fe_2O_3$ | 5 |
| $Al_2O_3$ | 30 |
| $MnO_2$ | 1 |

*Preferred Range*

| SiC | 61 to 75 |
|---|---|
| $Fe_2O_3$ | 0.5 to 5 |
| $Al_2O_3$ | 15 to 30 |
| $Mn_2O_2$ | 0.5 to 4 |

Phosphoric acid or a reactive phosphate is added to the mixture to convert at least a substantial part of the aluminum oxide to phosphate, as is customary in the art. The amount of phosphoric acid may be varied as, for example, from 2 to 6 percent. If $Ca_3(PO_4)_2$ is used in a formula containing a manganese compound, the amount of manganese used must be so small as to prevent fusion of the entire mass. (The foregoing percentages refer to parts by weight, based on the total weight of the materials employed.)

Electrical grade silicon carbide is ordinarily employed because it contains certain impurities which give it a desired non-linear conductivity. Any of the crystal sizes ordinarily employed in resistors may be used, ranging from about 35 to 240 mesh.

To produce a valve resistor containing manganese compound, the following procedure has been found satisfactory. The silicon carbide is weighed into a mixer. The aluminum oxide and manganese compound (usually as pyrolusite) are then weighed into the mixer together with any iron oxide or other iron compound that is employed. Minor amounts of other additives may be utilized, as is common in the industry, including ball clay, china clay, talc, Wollastonit, flint, feldspar, and other ceramic materials. The ingredients are mixed dry. Then concentrated phosphoric acid (85%) is added in an amount equal to about 4 percent by weight of $H_3PO_4$ based on the weight of the dry mixture. The resulting mix is pressed into valve block form in a steel die using 2500 to 5000 p.s.i., for example, 3500 p.s.i., or the mixture is extruded to form resistors. These operations are known in the art. The mixture is then dried by heating, for example, to about 350° F. The product is then fired in an inert or reducing atmosphere (e.g. nitrogen, carbon dioxide, carbon monoxide, hydrogen, helium, argon, superheated steam, etc.) to about 2200 to 2400° F. to bring about the reaction with the manganese, stabilize the phosphates, and produce the bond around the grains. The resistor is then subjected to a surge current which produces a path for the flow of current between the adjacent portions of contiguous grains, as is customary in the art, and in the resulting product it is customary to refer to the crystals as being in point contact.

The resulting product may be used in a lightning arrester or wherever resistors are employed. Such uses are suggested in the drawings, in which—

Figure 1:
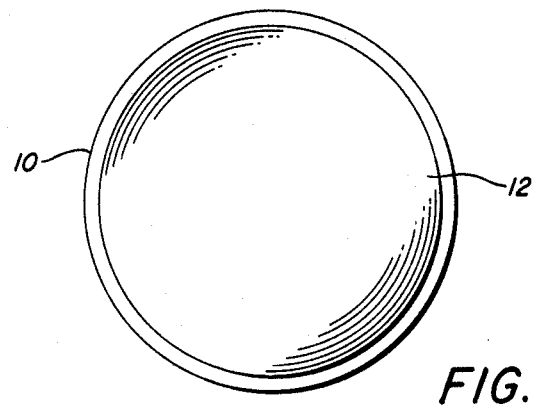
FIG. 1 is a plan view of a valve resistor for a lightning arrester.
Figure 2:
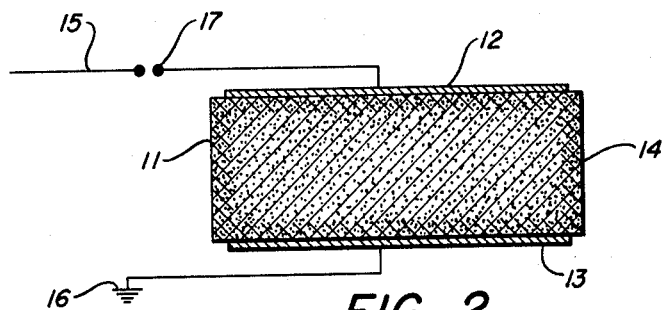
FIG. 2 is a vertical sectional view of the valve resistor of FIG. 1 with a schematic diagram illustrating the employment of the resistor with a series spark gap in a power circuit.

The valve resistor 10, illustrated in FIGS. 1 and 2, comprises a cylindrical body 11 having two metallic terminals 12 and 13 disposed substantially over the ends of the body. The terminals 12 and 13 are formed as metalized layers on the surfaces of the body or as circular plates bonded to the body during firing. One or more of the valve resistors are included in a lightning arrester and are connected in series with a gap 17 between a line 15 and a ground 16, as shown in FIG. 2.

In the arrangement of FIG. 2 the series gap 17 effectively isolates the line 15 from ground until such time as a voltage surge or other transient causes the gap 17 to arc-over. Current then flows from the line 15 through the gap 17 and the valve resistor 10 to ground 16 and continues for the duration of the surge. The current which flows during the period immediately following the termination of the surge or transient which initiates the arc-over of the gap 17 is designated as the follow current and is produced by the line voltage impressed upon the valve resistor 10 between the line 15 and ground 16.

Due to the non-linear characteristics of the valve resistor 10, the decrease in current through the resistor following the termination of the surge discharge results in an effective increase in the resistance of the block. Accordingly, the voltage across the arc gap 17 is reduced and the arc in the gap 17 is extinguished, thus interrupting the circuit between the line and ground. Obviously the more rapid the increase in resistance of the valve resistor with change in current magnitude, the more rapidly the gap 17 will be extinguished. The parameter used to designate this characteristic of the resistor is termed the exponent, from the slope of the current-voltage curve.

Valve resistors constructed in accordance with the invention display a voltage exponent of from 7 to 9 in the follow current region, whereas valve resistors constructed according to the prior art have a voltage exponent of 4 to 5 in the follow current region.

The total resistance between the terminals 12 and 13 of the valve resistor 10 at a given current is, of course, an element in the design of the resistor for any particular device or installation. The utilization of manganese compounds in the practice of the present invention, as set forth above, permits the control of resistance magnitude while substantially retaining the favorable exponent characteristics.

Another characteristic of the valve resistor determining its usefulness in lightning arresters relates to the durability of the resistor when subjected to long duration current discharges. The valve resistor of the invention displays greatly improved characteristics in this respect; for example, a valve resistor according to the prior art would withstand a long duration discharge of twice its follow current rating, whereas the valve resistor of the invention would withstand long duration square wave discharges of three to four times the follow current rating. Thus, a valve resistor according to the prior art rated at 300 amperes follow current withstood twenty 600 ampere-2000 microsecond square wave current discharges before destruction of the resistor, whereas a valve resistor according to the invention rated at 300 amperes follow current withstood twenty 900 to 1200 ampere-2000 microsecond current square wave discharges or forty 600 ampere-2000 microsecond current square wave discharges before destruction.

Figure 3:
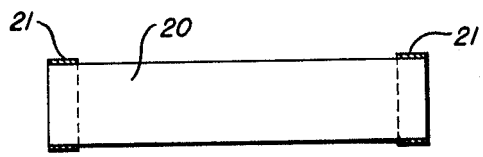
FIG. 3 is a side view of another non-linear resistor.
Figure 4:
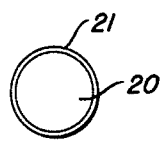
FIG. 4 is an end view of the resistor of FIG. 3.

In FIGS. 3 and 4 the non-linear resistor 20 includes an extruded cylindrical body having terminals 21 at the ends thereof. The terminals 21 may be formed as metalized layers on the exterior of the surface of the body or as cylindrical metallic pieces bonded to the body during firing. The resistor 20 is particularly useful in grading or control arrangements where severe space and/or thermal limitations exist.

This is a continuation-in-part of my application Serial No. 822,791 filed June 25, 1959, now Patent No. 3,040,282.

The invention is covered in the claims which follow.

What I claim is:

1. The method of producing a resistor which comprises mixing 50 to 80 percent of a carbide of the class consisting of silicon carbide, tungsten carbide and boron carbide; 5 to 35 percent material of the class consisting of (1) aluminum phosphate, (2) aluminum oxide and phosphoric acid, and (3) aluminum oxide and reactive phosphate; and 0.5 to 4 percent of a flux from the class consisting of compounds of manganese which on firing with the aforesaid carbide yield crystalline silicides of manganese; and then pressing the mixture into a block and firing to 2200 to 2400° F.

2. The process of claim 1 in which the carbide is silicon carbide and manganese oxide is added.

3. The method of claim 1 in which 0.5 to 5 percent of iron oxide is added to the composition.

4. The method of producing a resistor which comprises mixing 50 to 80 percent of silicon carbide, 5 to 35 percent aluminum oxide, 1 to 4 percent pyrolusite, and 2 to 6 percent phosphoric acid, and then pressing the mixture into a block and firing to 2200 to 2400° F.

5. The process of claim 4 in which 0.5 to 5 percent of iron oxide is added to the composition.

6. A non-linear resistor comprising a body constituted of a mass of carbide grains of the class consisting of silicon carbide, tungsten carbide and boron carbide, in which adjacent grains are in point contact throughout the block, and a ceramic bond is present over and between the grains and around said points of contact, said bond comprising aluminum phosphate and manganese silicide; and there are metallic terminals on the said body in electroconductive engagement with the grains thereof.

7. The resistor of claim 6 in which the grains are of silicon carbide, and manganese silicide is present in the ceramic bond.

References Cited in the file of this patent

UNITED STATES PATENTS

| | | |
|---|---|---|
| 2,000,719 | Slepian et al. | May 7, 1935 |
| 2,276,732 | Ludwig et al. | Mar. 17, 1942 |
| 2,374,527 | Earle | Apr. 24, 1945 |
| 2,445,296 | Wejnarth | July 13, 1948 |
| 2,589,157 | Stalhane | Mar. 11, 1952 |
| 2,806,005 | White | Sept. 10, 1957 |
| 2,888,406 | Bondley et al. | May 26, 1959 |
| 3,040,282 | Heath | June 19, 1962 |